(12) United States Patent
Wermelinger et al.

(10) Patent No.: US 11,768,183 B2
(45) Date of Patent: Sep. 26, 2023

(54) TESTING SLEEVE WELDING

(71) Applicant: Georg Fischer Rohrleitungssysteme AG, Schaffhausen (CH)

(72) Inventors: Joerg Wermelinger, Schaffhausen (CH); Riccardo Barbone, Schaffhausen (CH); Paul Kaftan, Niedereschach (DE)

(73) Assignee: Georg Fischer Rohrleitungssysteme AG

(*) Notice: Subject to any disclaimer, the term of this patent is extended or adjusted under 35 U.S.C. 154(b) by 466 days.

(21) Appl. No.: 17/063,201

(22) Filed: Oct. 5, 2020

(65) Prior Publication Data

US 2021/0132007 A1 May 6, 2021

(30) Foreign Application Priority Data

Oct. 30, 2019 (EP) .................................. 192062214

(51) Int. Cl.
*G01N 29/28* (2006.01)
*G01N 29/265* (2006.01)

(52) U.S. Cl.
CPC ........... *G01N 29/28* (2013.01); *G01N 29/265* (2013.01); *G01N 2291/2634* (2013.01); *G01N 2291/2675* (2013.01)

(58) Field of Classification Search
CPC .................. G01N 29/28; G01N 29/265; G01N 2291/0235; G01N 29/22;

(Continued)

(56) References Cited

U.S. PATENT DOCUMENTS 4,844,396 A * 7/1989 Norton .................... G01F 1/662
248/230.8
5,601,893 A * 2/1997 Strassel .................. F16L 11/14
138/131

(Continued)

FOREIGN PATENT DOCUMENTS

CA 2598432 A1 1/2009
CN 110031549 A 7/2019

(Continued)

OTHER PUBLICATIONS

U.S. Appl. No. 17/069,053, filed Oct. 13, 2020, Barbone, Riccardo & Wermelinger, Joerg.

(Continued)

*Primary Examiner* — Jacques M Saint Surin
(74) *Attorney, Agent, or Firm* — Harness, Dickey & Pierce, P.L.C.

(57) ABSTRACT

A method and device for the ultrasonic testing of a weld of an electric arc-welded sleeve (10) for plastic pipes (11), having the following steps:
  fastening a testing device (1) on the outer contour of the welded plastic pipe (11), comprising a circumferential fastening element (2) and a holder (3), the holder (3) preferably comprising a support (7), a carrier (8) and a gripper (9), and a coupling element with a recess,
  feeding a liquid, preferably water, into the recess (5) of the coupling element (4),
wherein the recess (5) in the coupling element (4) is fully filled with the liquid, and a constant liquid column is maintained in the coupling element (4) during the ultrasonic testing in order to transmit the ultrasound.

15 Claims, 7 Drawing Sheets

(58) Field of Classification Search
CPC ......... G01N 2291/0289; G01N 29/043; G01N 29/225; G01N 29/04; G01N 2291/1267; G01N 2291/2675; G01N 2291/2634; B29C 65/34; B29C 66/5221; B29C 66/5229; B29C 65/8292; B29C 66/1122; B29C 66/1142
USPC .......................................................... 73/588
See application file for complete search history.

(56) References Cited

U.S. PATENT DOCUMENTS

| | | | |
|---|---|---|---|
| 5,677,490 A * | 10/1997 | Gunther | G01N 29/043 73/620 |
| 6,460,897 B1 * | 10/2002 | Manuli | F16L 33/2076 285/259 |
| 6,497,159 B1 | 12/2002 | Lavoie | |
| 8,042,399 B2 * | 10/2011 | Pasquali | G01N 29/262 73/622 |
| 8,087,298 B1 | 1/2012 | DiMambro et al. | |
| 8,186,643 B2 * | 5/2012 | Luo | F16L 41/008 248/230.8 |
| 8,517,430 B2 * | 8/2013 | Dole | F16L 21/08 285/368 |
| 9,255,641 B2 | 2/2016 | Raible et al. | |
| 10,179,437 B2 | 1/2019 | Wermelinger et al. | |
| 11,518,111 B2 * | 12/2022 | Barbone | B29C 65/8292 |
| 2004/0016299 A1 | 1/2004 | Glascock et al. | |
| 2006/0055399 A1 | 3/2006 | Georgeson et al. | |
| 2007/0227249 A1 | 10/2007 | Meier et al. | |
| 2012/0204645 A1 | 8/2012 | Crumpton et al. | |
| 2016/0252482 A1 | 9/2016 | Yoon et al. | |
| 2019/0128850 A1 | 5/2019 | Brignac et al. | |

FOREIGN PATENT DOCUMENTS

| | | | | |
|---|---|---|---|---|
| DE | 102008053556 A1 * | 5/2009 | ........... | G01N 29/225 |
| DE | 102008030688 A1 | 1/2010 | | |
| DE | 102010010327 A1 * | 10/2010 | ........... | B29C 65/082 |
| DE | 102012101579 A1 | 8/2013 | | |
| DE | 102017122066 A1 | 3/2018 | | |
| EP | 2759392 A1 | 7/2014 | | |

OTHER PUBLICATIONS

U.S. Appl. No. 17/074,066, filed Oct. 19, 2020, Wermelinger, Joerg & Barbone, Riccardo.

* cited by examiner

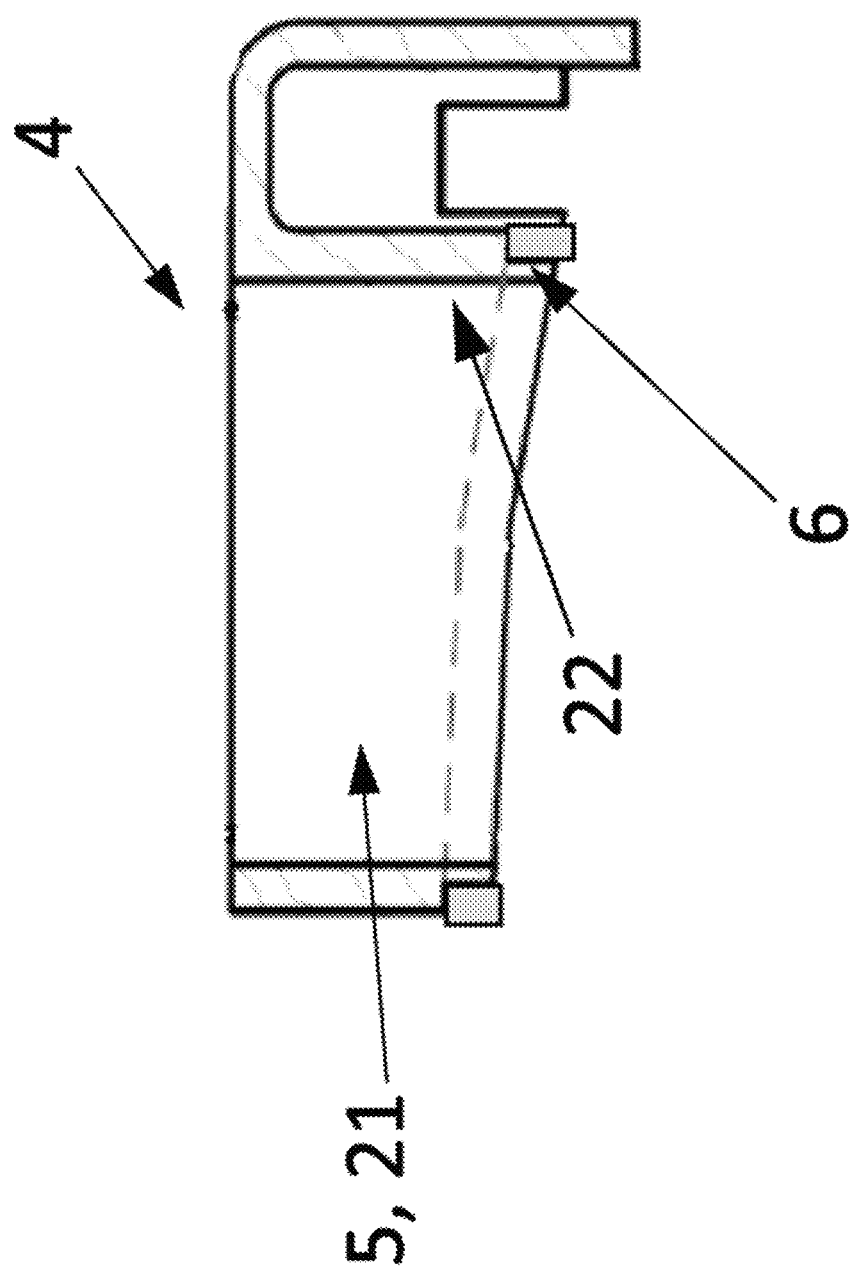

TESTING SLEEVE WELDING

BACKGROUND OF THE INVENTION

1. Field of the Invention

The invention relates to a method and a device for the ultrasonic testing of a weld of an electric arc-welded sleeve for plastic pipes, having the following steps and components:
fastening a testing device on the outer contour of the welded plastic pipe, the testing device comprising: a circumferential fastening element, a holder and a coupling element,
feeding a liquid into the recess of the coupling element.

2. Discussion

The nondestructive inspection of test objects by means of ultrasound is prior art and is used in many fields, for example in aircraft construction. This method is primarily used for metallic materials since they have good sound conductivity.

Ultrasonic testing is intended to be used for finding internal and external defects that would not be detectable without destruction of the test object.

CN 110031549 A1 discloses a device for testing the weld seam of pipes butt-welded to one another.

A disadvantage of this embodiment is that it is not suitable for ultrasonic tests for electric arc-welded sleeves.

SUMMARY OF THE INVENTION

It is an aspect of the invention to provide a method and an associated device making it possible to carry out ultrasonic testing of pipes welded by means of an electric arc-welded sleeve.

This aspect is achieved according to the invention in that the coupling element comprises a continuous recess in the central region and a compressible retaining element is arranged on the lower side of the coupling element, the retaining element being used to retain the liquid fed into the coupling element, the recess in the coupling element being fully filled with the liquid and a constant liquid column being maintained in the coupling element during the ultrasonic testing in order to transmit the ultrasound.

It is advantageous that liquid is fed constantly into the coupling element during the testing process. Since there is not an absolute seal during the testing between the coupling element and the electric arc-welded sleeve, on which the coupling element bears and on the circumference of which the coupling element rotates, there must nevertheless be a liquid column in the recess of the coupling element throughout the entire testing process in order to couple the ultrasound into the electric arc-welded sleeve, or onto the weld position.

In order to carry out a test of the welding of the electric arc-welded sleeve to the pipe, the testing device is preferably rotated around the sleeve and the pipe welded thereto. In this way, such a test may be carried out on electric arc-welded sleeves already installed in pipeline systems.

Preferably, the rotation of the testing device comprises at least 360°. This ensures complete testing of the weld.

The testing device according to the invention for ultrasonic testing of a weld of an electric arc-welded sleeve for plastic pipes comprises a circumferential fastening element, a holder and a coupling element, the coupling element being used for coupling the ultrasound into the weld, the holder being the connection between the circumferential fastening element and the coupling element. The coupling element comprises a continuous recess in the central region and a compressible retaining element is arranged on the lower side of the coupling element, the retaining element being used to retain the liquid fed into the coupling element. The coupling element is rotated around the outer contour of the electric arc-welded sleeve by means of the testing device in order to test the entire weld seam. Since there is a liquid in the recess of the coupling element, this recess being fully open, and the liquid therefore comes into contact with the lateral surface of the electric arc-welded sleeve, a loss of liquid occurs because of the rotation. Absolute sealing between the coupling element and the outer contour of the electric arc-welded sleeve is scarcely achievable because of the irregularities on the outer contour. In order to maintain a constant liquid column in the recess despite this, the loss of liquid is minimized by means of the retaining element.

It is advantageous for the surface of the continuous recess to be made from polyamide (PA). This means that the liquid column is surrounded by polyamide. The coupling element may also be made from a polyamide, although it is also possible for the coupling element to be formed from a different material and for a polyamide insert, which forms the continuous recess, then to be introduced into the coupling element. Preferably, the polyamide extends in the form of an edge into the retaining element, or the retaining element encloses a narrow protruding edge, so that the edge bears on the sleeve and the retaining element mostly bridges irregularities. By virtue of the uniform polyamide surface, which encloses the liquid, the signal quality of the ultrasound is very good because of the consistent sound properties.

Preferably, the retaining element is made from a spongy material, particularly preferably a sponge. In this way, it is possible to compensate for irregularities in the lateral surface of the electric arc-welded sleeve. The retaining element thus lies in indented grooves as well as on elevations on the lateral surface and retains the liquid in the recess, liquid being fed constantly into the coupling element in order to compensate for the liquid escaping despite the retaining element and in order to maintain the liquid column.

It is advantageous for the circumferential fastening element to be configured as a chain, the standard chain links preferably comprising a hook and a hook recess and being hooked to one another. By virtue of the fact that the fastening element is configured as a chain, the fastening element may be mounted on, or placed around, already existing pipelines and closed, and also that is it lengthenable and shortenable as desired. By virtue of the hooks and hook recess, the standard chain links may be connected to one another by merely hanging in one another.

One advantageous configuration of the testing device according to the invention consists in the holder comprising a support, the support being configured as a chain link and being integrated into the chain by hooking. The support preferably comprises an angle encoder that monitors the angle of rotation of the testing device. It has also been found to be advantageous for antisliding elements to be arranged on the holder, so that the testing device is prevented from sliding in the case of vertically placed pipelines. Preferably, these are arranged as round discs at the articulation of the holder and come into contact with the lateral surface of the pipeline.

Preferably, a gripper is arranged on the holder, the coupling element being fastened to the gripper. Preferably, the gripper comprises fastening struts, on which the coupling element is fastened and correspondingly positioned, since the testing device is usable for different electric arc-welded sleeves and different diameters.

Preferably, the holder comprises a guide on which the gripper is arranged. By virtue of this guide, the gripper can be adjusted parallel to the pipeline axis. In order to position the coupling element at the level of the weld seam, which is not visible since the weld seam is formed in the sleeve between the nut and the outer contour of the pipe, the coupling element preferably comprises a stop, which is stopped on the sleeve, as a result of which the coupling element is positioned correctly.

All configurational possibilities are freely combinable with one another, and all features mentioned in connection with the method may be combined with the testing device, and vice versa.

BRIEF DESCRIPTION OF THE DRAWINGS

An exemplary embodiment of the invention will be described with the aid of the figures, the invention not being restricted just to the exemplary embodiment.

FIG. 7 shows a longitudinal section through a coupling element.

DESCRIPTION OF THE PREFERRED EMBODIMENTS

Figure 1:
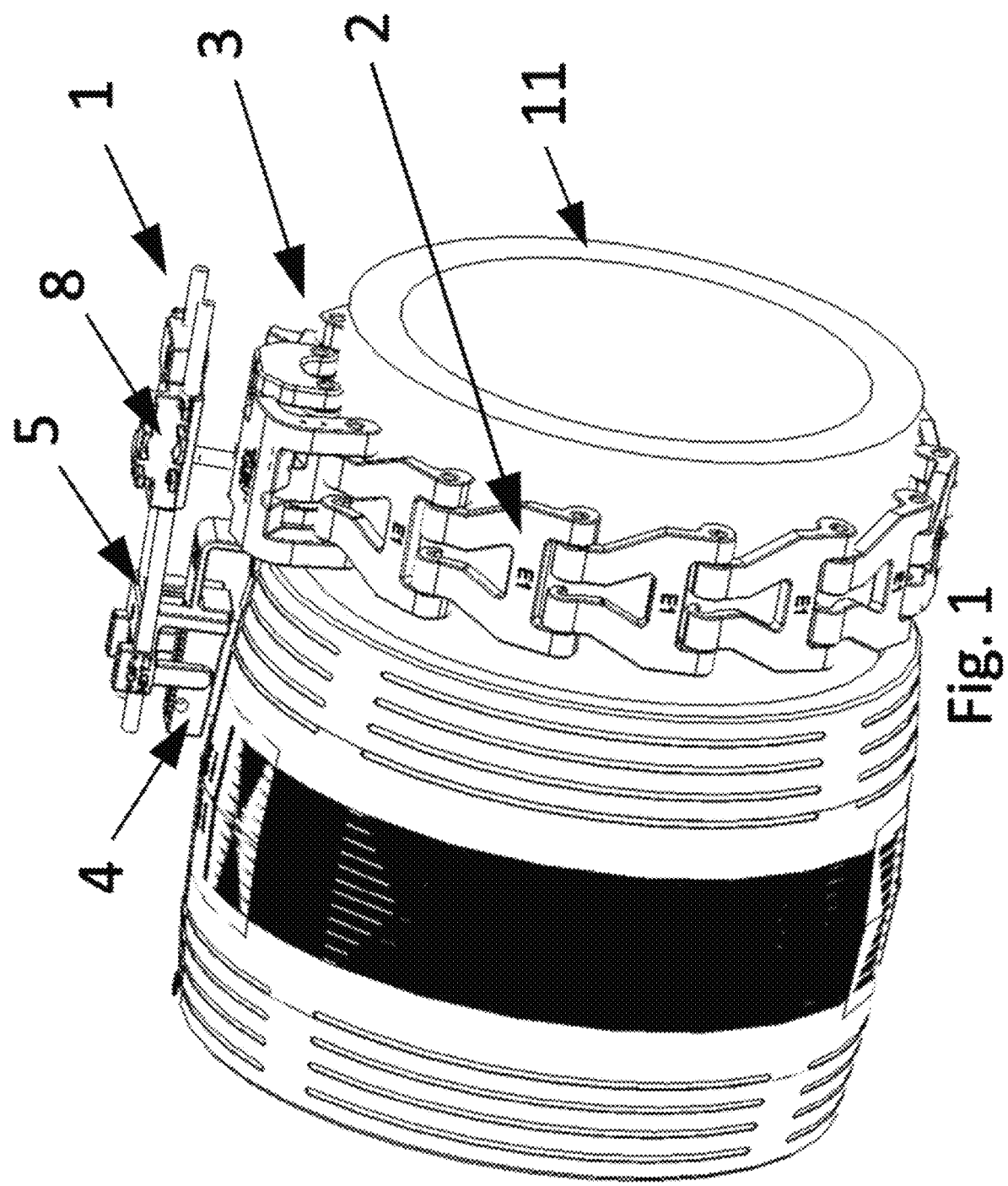
FIG. 1 shows a three-dimensional view of a fastened testing device according to the invention.
Figure 2:
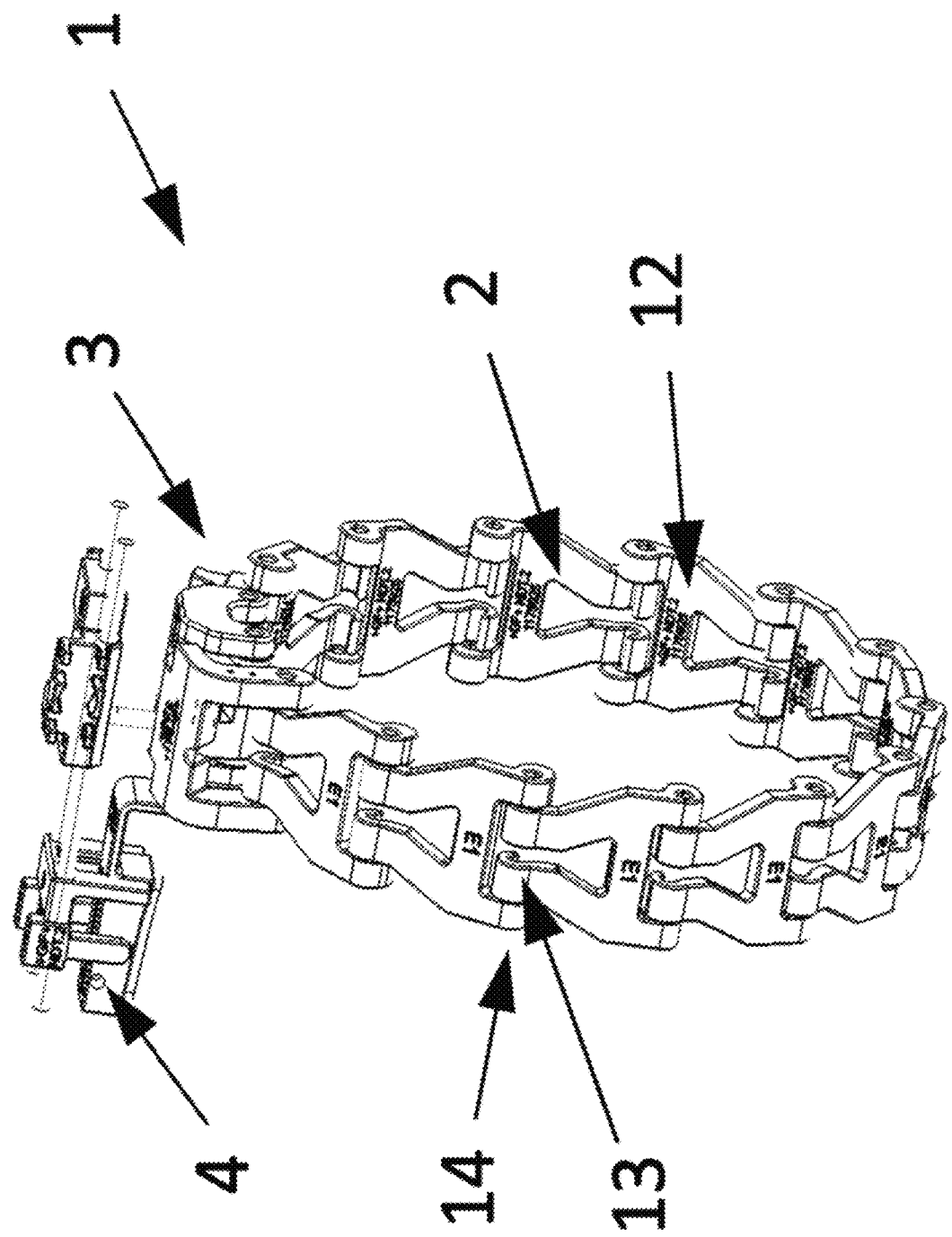
FIG. 2 shows a three-dimensional view of a testing device according to the invention.
Figure 3:
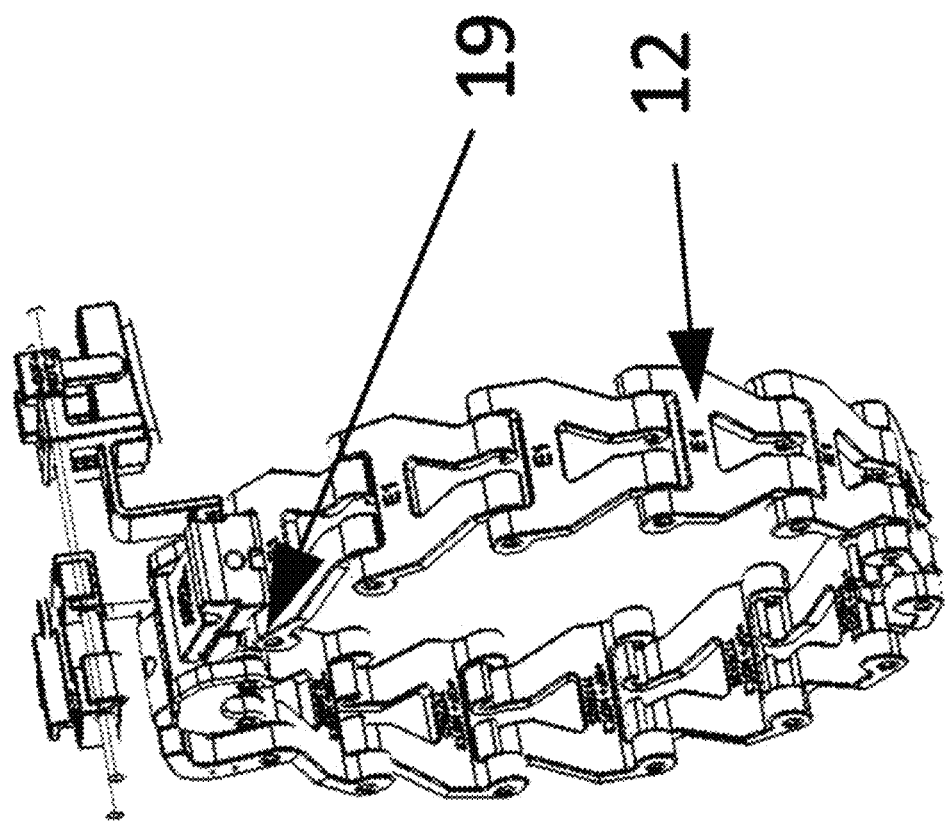
FIG. 3 shows a three-dimensional view of a testing device according to the invention.
Figure 4:
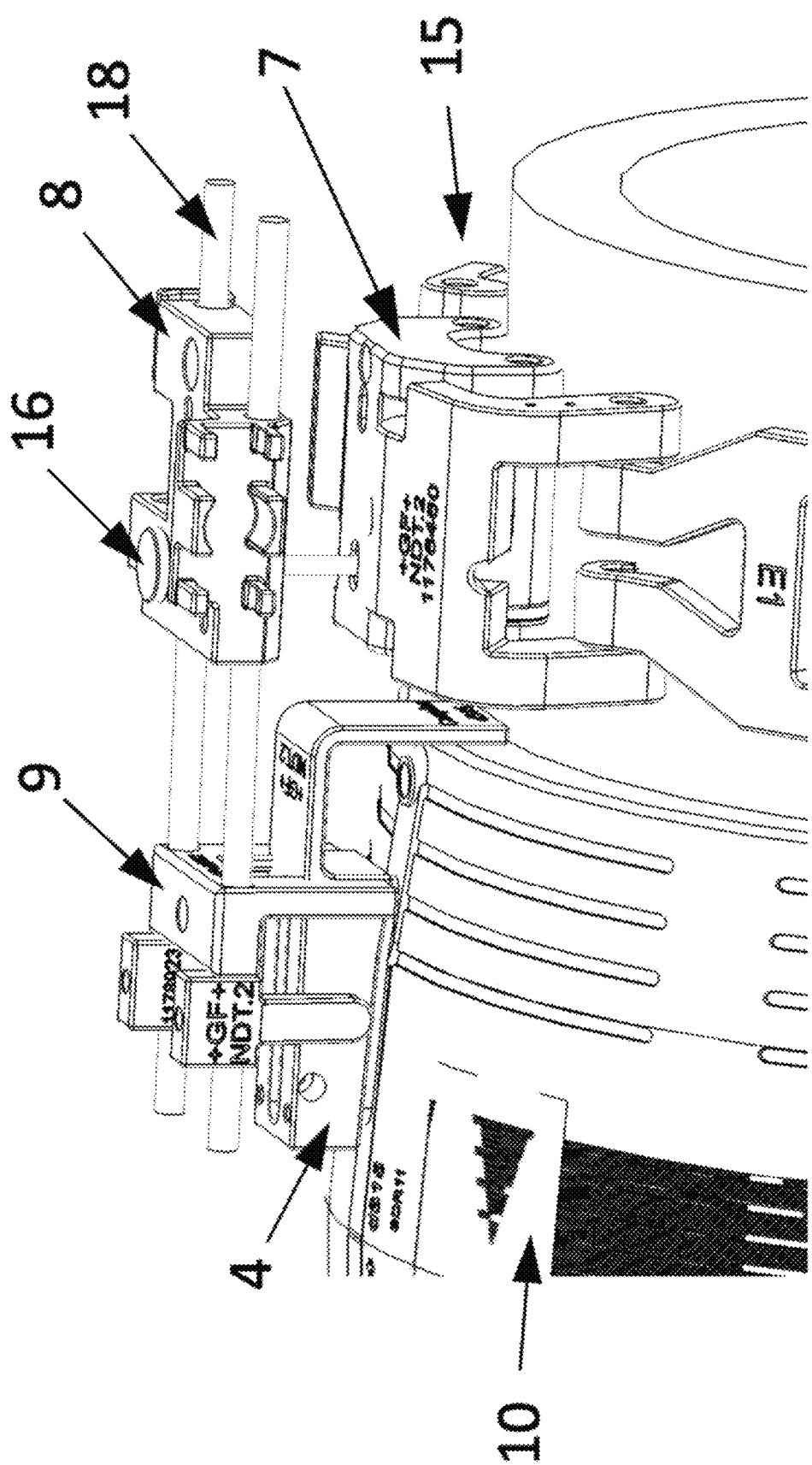
FIG. 4 shows a three-dimensional view of the holder with a coupling element of a fastened testing device.
Figure 5:
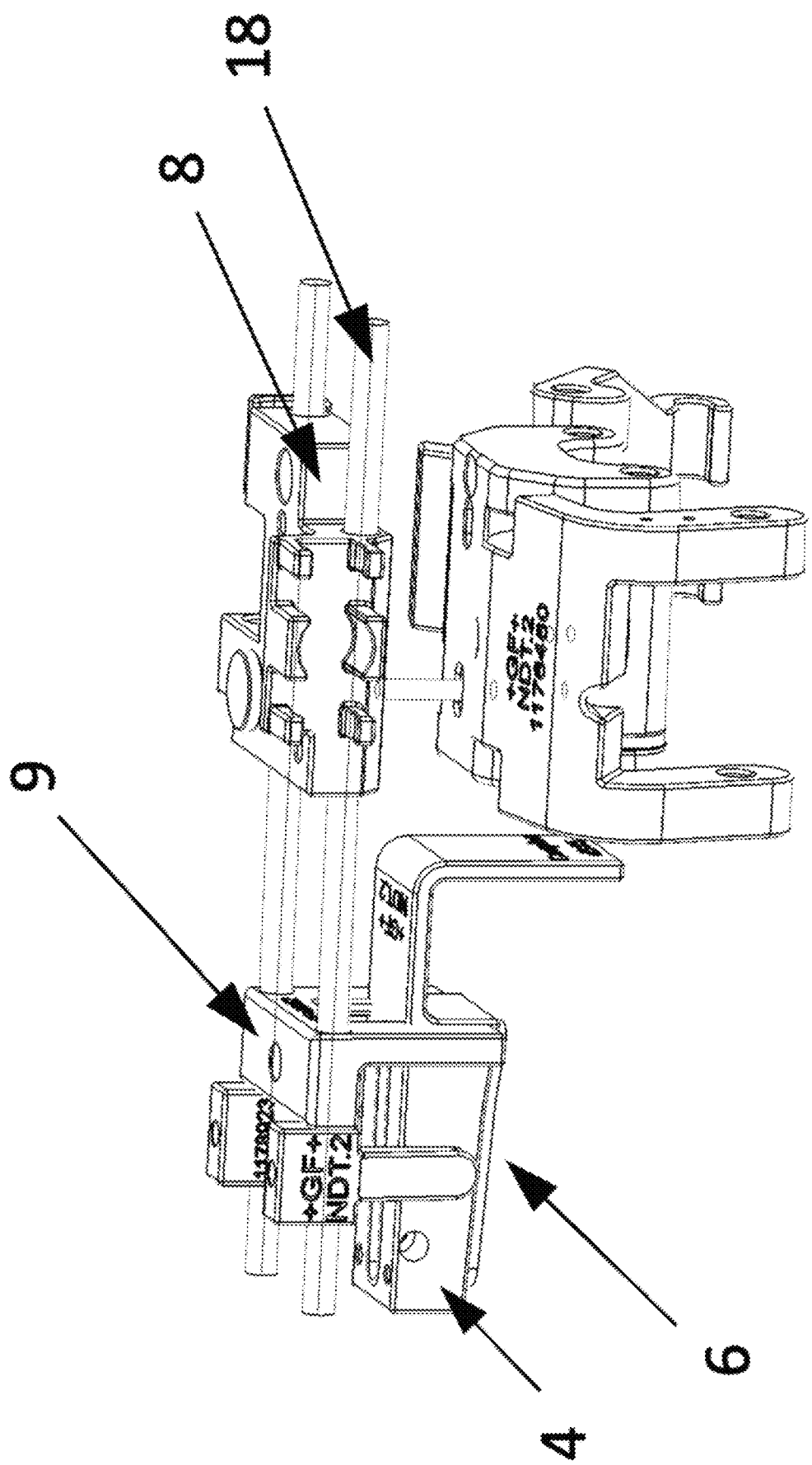
FIG. 5 shows a three-dimensional view of the holder with a coupling element.
Figure 6:
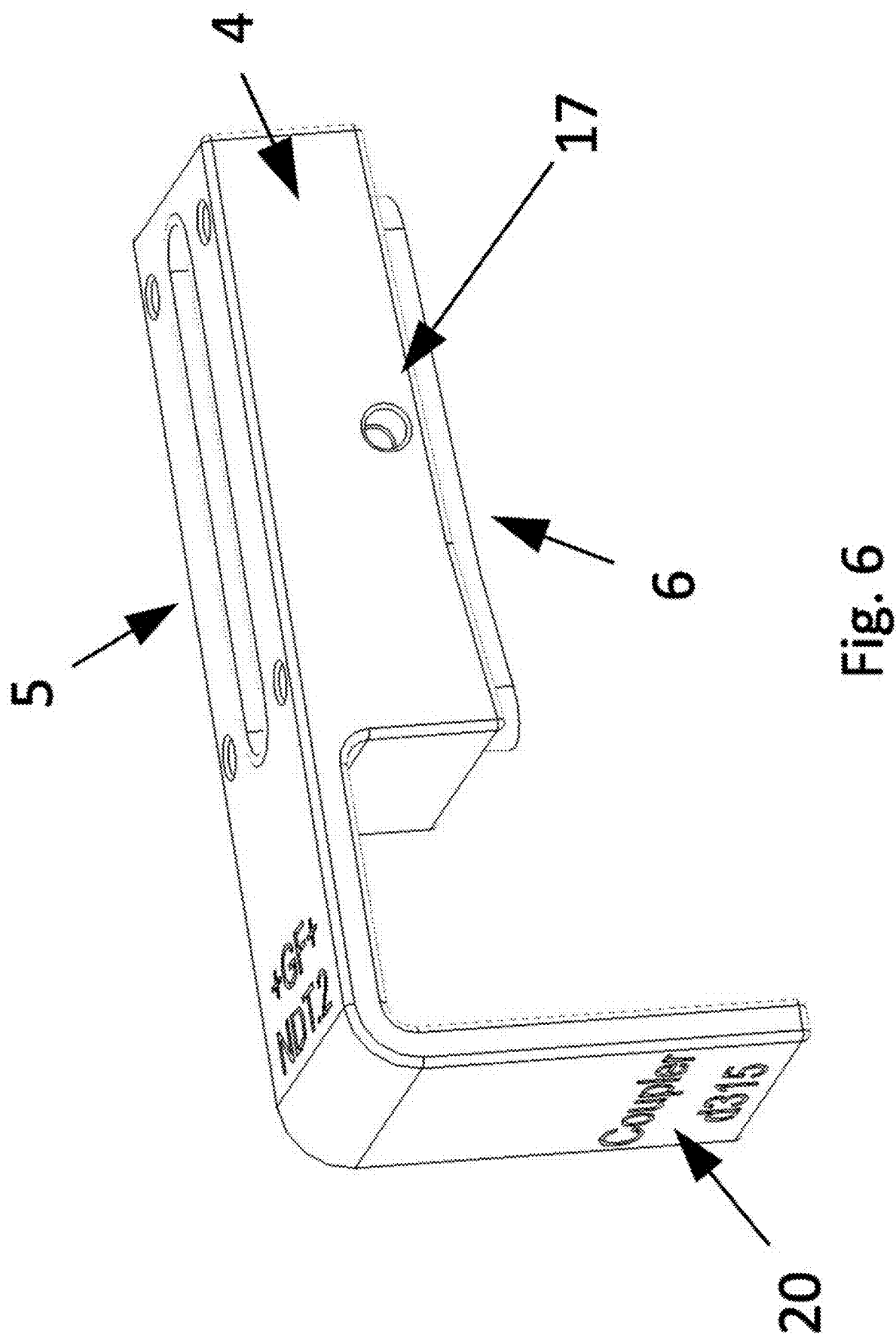
FIG. 6 shows a three-dimensional view of a coupling element.

The drawing represented in FIG. 1 shows a testing device 1 according to the invention for ultrasonic testing of a weld of an electric arc-welded sleeve 10 for plastic pipes 11. The testing device 1 comprises a circumferential fastening element 2, the latter being placed around the plastic pipe 11 for the testing. Preferably, the fastening means 2 is configured as a chain and comprises standard chain links 12. The chain links 12 preferably comprise hooks 13 and hook recesses 14, as a result of which the links 12 are connected to one another by merely hooking in and no screws have to be elaborately tightened or untightened. This has the advantage that the chain 2 can rapidly be mounted, or adapted in terms of length. The testing device 1 according to the invention comprises a holder 3, the holder 3 being arranged on the circumferential fastening element 2. The holder 3 preferably comprises a support 7, which is formed as a chain link and can therefore be easily fitted or hooked into the chain 2. An angle encoder 15, which records the angle over which the testing takes place and also ensures that 360° testing is carried out, is also preferably arranged on the holder 3. The holder 3 preferably comprises a carrier 8, the latter adjusting the setting of the application pressure of the coupling element 4 on the lateral surface of the electric arc-welded sleeve 10 with the aid of an adjustment unit 16, and also being used as a support for the liquid regulation and feed by a tube and a valve (not represented), which feeds the liquid into the coupling element 4, being fastened thereto. The coupling element 4 arranged on the testing device 1 is used to transmit the ultrasound into the electric arc-welded sleeve 10, or to the weld therein. The coupling element 4 is fastened to the holder 3 and is thereby adjustable. The ultrasonic testing apparatus (not visible) is applied on the upper side of the coupling element 4, as a result of which the ultrasound is directed approximately perpendicularly onto the lateral surface of the electric arc-welded sleeve 10 and passes through the recess 5, clearly visible in FIG. 6, in the coupling element 4, this recess 5 being filled with a liquid. Arranged on the lower side of the coupling element 4, there is a retaining element 6 which retains the liquid for transmitting the ultrasound in the recess 5 in order to maintain a liquid column. Furthermore, the liquid is fed into the coupling element 4 through the feed 17 in order to compensate for the loss of the liquid during the testing.

The coupling element 4 is preferably arranged adjustably on a gripper 9. It is advantageous for the gripper to be arranged on a guide 18, the guide 18 extending parallel to the pipe axis and preferably being connected to the carrier 8. Antisliding elements 19 are preferably arranged on the holder 3, these preventing the testing device 1 according to the invention from sliding down in the case of a vertically extending pipeline.

The coupling element 4 comprises a stop 20 for correct positioning on the electric arc-welded sleeve 10, so that it is positioned directly above the weld seam.

FIG. 7 shows the coupling element 4 in longitudinal section. The surface 21 of the recess 5 is made from a polyamide, the coupling element 4 being represented here as a single piece. Alternatively, the surface 21 may also be formed by an insert which is fitted into the coupling element 4, as a result of which the coupling element need not consist of the same material. It is advantageous for an edge 22 to protrude into the retaining element 6. The liquid column is therefore surrounded only by PA, which ensures a good signal quality.

What is claimed is:

1. A method for the ultrasonic testing of a weld of an electric arc-welded sleeve (10) for plastic pipes (11), comprising:
   fastening a testing device (1) on the outer contour of the welded plastic pipe (11), the testing device including a circumferential fastening element (2), a holder (3), and a coupling element with a recess,
   feeding a liquid into the recess (5) of the coupling element (4),
   rotating the testing device around the plastic pipe, and
   wherein the recess (5) in the coupling element (4) is fully filled with the liquid, and a constant liquid column is maintained in the recess during the ultrasonic testing in the coupling element (4) in order to transmit the ultrasound.

2. A method according to claim 1, liquid is fed constantly into the coupling element (4) during the testing process.

3. A method according to claim 1, wherein the testing device (1) is rotated around the plastic pipe (11) and the electric arc-welded sleeve (10) in order to test the weld.

4. A method according to claim 1, wherein the rotation of the testing device (1) comprises at least 360°.

5. A testing device (1) for ultrasonic testing of a weld of an electric arc-welded sleeve (10) for plastic pipes (11), comprising a circumferential fastening element (2), a holder (3) and a coupling element (4), the coupling element (4) being used for coupling the ultrasound into the weld, the holder (3) being the connection between the circumferential fastening element (2) and the coupling element (4), wherein the coupling element (4) comprises a continuous recess (5) in the central region and a compressible retaining element (6) is arranged on the lower side of the coupling element (4), the retaining element (6) being used to retain the liquid fed into the coupling element (4).

6. A testing device (1) according to claim 5, wherein the surface of the continuous recess (5) is made from polyamide (PA).

7. A testing device (1) according to claim 5, wherein the retaining element (6) consists of a spongy material.

8. A testing device according to claim 5, wherein the circumferential fastening element is configured as a chain having chain links with a hook and a hook recess and being hooked to one another.

9. A testing device (1) according to claim 8, wherein the holder (3) comprises a support (7), the support (7) being configured as a chain link and being integrated into the chain by hooking.

10. A testing device (1) according to claim 1, wherein the holder (3) comprises a gripper (9), the gripper (9) receiving the coupling element (4).

11. A testing device (1) according to claim 1, wherein the gripper (9) is adjustably positioned by means of a guide.

12. A method according to claim 1, wherein the holder (3) comprising a support (7), a carrier (8) and a gripper (9).

13. The testing device of claim 5 wherein the coupling device is longitudinally displaced about the pipe from a rotational plane of the circumferential fasting element.

14. A testing device for testing of a circumferential weld on plastic pipes, comprising:

chain having a plurality of links, the chain being configured to be a rotated about a major axis of the pipes;

a coupling element having an upper surface and a lower surface, the coupling element having a recess extending therethrough from the upper surface to the lower surface;

a retaining element on the lower surface of the coupling element, the retaining element being in the form of a sponge;

a holder subassembly, the holder subassembly including:
a support coupled to the chain between adjacent links;
a gripper for gripping the coupling element; and
an adjustment device having guide rods extending parallel to a major axis of the pipes, one end of the adjustment device being connected to the support and another and of the adjustment device being coupled to the gripper wherein the coupling element is longitudinally displaced from the chain;

a liquid supply for delivering a liquid to the recess in the coupling element; and wherein the weld is ultrasonically tested through of the liquid in the recess, with the retaining element being configured to retain liquid in the recess.

15. The testing device of claim 13 where in the coupling element further comprises:
a lip extending towards the chain and bent radially inwardly to engage an edge of a pipe serving to aid in the positioning of the coupling element.

* * * * *